(12) United States Patent
Keshavmurthy et al.

(10) Patent No.: US 8,233,156 B2
(45) Date of Patent: Jul. 31, 2012

(54) HYBRID SENSOR

(75) Inventors: Shyam P. Keshavmurthy, Ann Arbor, MI (US); Chengchih Lin, Ann Arbor, MI (US); David Crowther, Bloomfield Township, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 13/223,944

(22) Filed: Sep. 1, 2011

(65) Prior Publication Data

US 2011/0310399 A1    Dec. 22, 2011

Related U.S. Application Data

(62) Division of application No. 12/474,911, filed on May 29, 2009, now Pat. No. 8,031,345.

(51) Int. Cl.
  *G01C 9/00* (2006.01)
(52) U.S. Cl. ........................................................ 356/620
(58) Field of Classification Search ........................ None
  See application file for complete search history.

(56) References Cited

U.S. PATENT DOCUMENTS

| | | |
|---|---|---|
| 4,687,326 A | 8/1987 | Corby, Jr. |
| 4,846,577 A | 7/1989 | Grindon |
| 5,175,601 A | 12/1992 | Fitts |
| 5,218,427 A | 6/1993 | Koch |
| 5,361,308 A | 11/1994 | Lee et al. |
| 5,615,003 A | 3/1997 | Hermary et al. |
| 5,680,215 A | 10/1997 | Huber et al. |
| 5,870,220 A | 2/1999 | Migdal et al. |
| 6,492,651 B2 | 12/2002 | Kerekes |
| 6,542,246 B1 | 4/2003 | Toida |
| 6,549,288 B1* | 4/2003 | Migdal et al. ................. 356/603 |
| 6,621,063 B2 | 9/2003 | McQueen |
| 6,760,116 B2 | 7/2004 | Iwasaki |
| 6,788,210 B1 | 9/2004 | Huang et al. |
| 6,858,826 B2 | 2/2005 | Mueller et al. |
| 7,286,223 B2 | 10/2007 | Denney et al. |
| 7,286,246 B2 | 10/2007 | Yoshida |
| 7,379,193 B2 | 5/2008 | Liu |
| 7,595,892 B2 | 9/2009 | Judell et al. |
| 7,602,507 B2* | 10/2009 | Ersue et al. ................... 356/604 |
| 7,620,209 B2 | 11/2009 | Stevick et al. |
| 7,719,672 B2 | 5/2010 | Kohayase et al. |
| 2005/0231734 A1 | 10/2005 | Johannesson et al. |
| 2007/0124949 A1 | 6/2007 | Burns, Jr. et al. |
| 2008/0273194 A1 | 11/2008 | De Sloovere et al. |

FOREIGN PATENT DOCUMENTS

| | | |
|---|---|---|
| EP | 1 906 139 A1 | 4/2008 |
| JP | 61 025003 A | 2/1986 |
| WO | WO 94/16290 A1 | 7/1994 |
| WO | WO 2009/120073 A2 | 10/2009 |

(Continued)

OTHER PUBLICATIONS

International Search Report for Application No. PCT/US2010/036136 Dated Oct. 18, 2010.

(Continued)

*Primary Examiner* — Tu Nguyen
(74) *Attorney, Agent, or Firm* — Brinks Hofer Gilson & Lione

(57) ABSTRACT

A sensor system and method for analyzing a feature in a sensing volume. The system imaging the feature with a first sensor and a second sensor that cooperate to form a contiguous sensing volume.

18 Claims, 8 Drawing Sheets

FOREIGN PATENT DOCUMENTS

WO  WO 2010/034301 A2  4/2010
WO  WO 2010/138543 A1  12/2010

OTHER PUBLICATIONS

Simon Winkelbach et al., "Low-Cost Laser Range Scanner and Fast Surface Registration Approach", Jan. 1, 2006, Pattern Recognition: 28$^{th}$ Dagm Symposium, Berlin, Germany, Sep. 12-14, 2006; Proceedings; Lecture Notes in Computer Science, Springer, Berlin, DE, pp. 718-728.

Notice of Allowance for U.S. Appl. No. 13/223,953, Mailed Mar. 7, 2012.
Notice of Allowance for U.S. Appl. No. 12/474,911, Mailed Jun. 2, 2011.
Office Action for U.S. Appl. No. 13/223,953, Dated Nov. 22, 2011.
European Communication for Application No. 10728471.3, Dated Jan. 16, 2012.
Notification of Transmittal of International Preliminary Report on Patentability for Application No. PCT/US2010/036136 Dated Jan. 7, 2011.

\* cited by examiner

HYBRID SENSOR

PRIORITY AND CROSS REFERENCE TO RELATED APPLICATION

This application is a divisional application of U.S. Ser. No. 12/474,911 filed May 29, 2009 entitled "Hybrid Sensor", the contents of which are incorporated herein by reference.

BACKGROUND

1. Field of the Invention

The present invention generally related to sensor system for determining the position or orientation of a feature.

2. Description of Related Art

The availability of 3D point cloud data has enabled absolute metrology systems. There are various modalities through which the 3D data is acquired. Laser scanning and moiré fringe techniques are some of the more popular commercial methods. These two methods produce reliable data in certain circumstances. Laser scanning typically relies on a motion device to provide 3D data. Motion can increase the cycle time of a measurement and may be impractical for many applications. Moiré fringe techniques rely on photogrammetric targets to calibrate and provide 3D data. The photogrammetric technique relies on several targets mounted on top of a sample part to obtain 3D data but produces point cloud information without sensor or part translation. However, these techniques can require multiple images to solve for the absolute depth and calibration is extensive. In addition, discontinuities in a surface may cause sensing problems.

In view of the above, it is apparent that there exists a need for an improved sensor system.

SUMMARY

In satisfying the above need, as well as overcoming the enumerated drawbacks and other limitations of the related art, the present application provides various sensor system embodiments for analyzing a feature in a sensing volume. In one embodiment, the sensor system includes a first laser source, a second laser source, and a sensor. The first laser source projects a laser line into the sensing volume and onto the feature forming a laser stripe on the feature. The sensor images the laser stripe where the laser line intersects with the feature. The relationship between the sensor and the first laser source is precalibrated, for example in a factory calibration. The second laser source projects a pattern onto the feature such that the pattern intersects the laser stripe on the feature. The sensor uses the laser stripe as a reference depth for the pattern projected by the second laser source.

In another embodiment, a sensor system for analyzing a feature in a contiguous sensing volume includes a laser source, a first sensor, and a second sensor. The laser source being attached to a mounting structure and configured to project a pattern onto the feature forming a laser stripe on the feature. The first sensor being attached to the mounting structure and configured to image the laser stripe where the laser line intersects with the feature, the relationship between the first sensor and the first laser source having been precalibrated. The second sensor being attached to the mounting structure and configured to image the laser stripe where the laser line intersects with the feature, the relationship between the second sensor and the first laser source also having been precalibrated. The first sensor having a field of view that intersects with the pattern projected from the first laser source forming a first sensing volume. Similarly, the second sensor having a field of view that intersects with the pattern projected from the first laser source forming a second sensing volume. The first and second sensing volume forming a contiguous sensing volume for the system.

Further objects, features and advantages of this invention will become readily apparent to persons skilled in the art after a review of the following description, with reference to the drawings and claims that are appended to and form a part of this specification.

DETAILED DESCRIPTION

Figure 1:
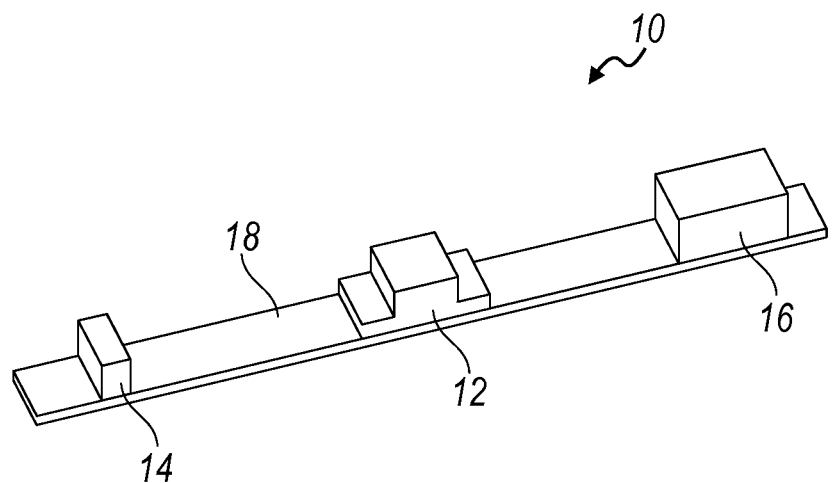
FIG. 1 is a block diagram illustrating a sensor system in accordance with one embodiment of the invention.

Referring now to FIG. 1, a system embodying the principles of the present invention is illustrated therein and designated at 10. The system 10 includes sensor 12, a first laser source 14, a second laser source 16, and a mounting structure 18.

The sensor 12 may comprise receiving optics and a detector such as a CCD or CMOS array. Accordingly, the sensor 12 has a field of view that projects outwardly from the camera and a range of focus that is defined by the receiving optics of the sensor. The field of view and depth of focus define a sensing volume of the sensor 12. The first laser source 14 may project one or more laser lines. If more than one laser line is projected from the first laser source 14 the lines may be parallel to one another. In addition, the laser lines may be equally spaced with respect to each other. The first laser source 14 is oriented at an angle relative to the sensor such the laser lines intersect the field of view to define the sensing volume. In one configuration, the laser lines may be projected such the center laser line intersects the center of the sensing volume. Alternatively, if there are an even number of laser lines, the middle two laser lines may be approximately an equal distance from the center of the sensing volume.

The sensor 12 and the first laser source 14 may both be attached to the mounting structure 18. The mounting structure 18 may be an optical bench, tube, or other rigid form. The mounting structure 18 may be made from a material with a low coefficient of expansion so that the relationship between the sensor 12 and the first laser source 14 is held constant across a wide temperature range. Alternatively, the mounting structure 18 may include a number of temperature sensors to compensate for expansion of the mounting structure material. The mounting structure 18 may be formed from a number of materials including but not limited to steel, invar, aluminum, or other industrial materials. For example, the mounting structure 18 may be an I-tube (shown as reference numeral 1510 in FIG. 15). As such, the mounting structure 18 provides both passive thermal management as well as provides a linear response. The linear response without hysteresis enables accurate active thermal compensation.

The sensor 12 and the first laser source 14 may be factory aligned relative to one another. For example, the sensor 12 and first laser source 14 may be mounted onto the mounting structure 18 with the use of various fixtures to control the alignment and/or relative position of the sensor 12 and first laser source 14. In addition, the sensor 12 and first laser source 14 may be mounted to a precision stage, for example through the mounting structure 18. The precision stage may include a known target. The known target may be moved throughout the sensing volume by the precision stage such that the relationship between the sensed position of the target can be calibrated throughout the sensor volume. The calibration can be stored in the sensor as various sensor system model parameters including sensor parameters, laser source parameters, etc.

Based on the calibration, the relationship between the sensor 12 and the first laser source 14 is known and triangulation may be used to determine the distance from the sensor 12 to a position where a laser line intersects a feature in the sensing volume. As such, the position of the feature relative to the sensor 12 can be determined based on the factory calibration regardless of the orientation or positioning of the sensor 12. Further, a system including many sensors may be formed by determining the position and orientation of each sensor relative to a master coordinate space. This may be done for larger systems by using a laser tracker or theodalites to determine the position and orientation of the sensors directly or by using such devices to determine the position and orientation of a target in the sensing volume then determining a transform between the sensor coordinate space and the master coordinate space.

A second laser source 16 may also be provided. The second laser source 16 may be a laser projector such as a structured light projector or a moiré fringe projector. The second laser source 16 may be mounted to the mounting structure 18 or alternatively may be mounted independently of the mounting structure 18. If the second laser source 16 is mounted on the mounting structure 18, the position and orientation of the second light source may be factory calibrated similar to the first laser source 14. However, often times the geometry of the part or the tooling where the part is to be measured may present certain environmental constraints that would limit the effectiveness of the second laser source 16 being mounted to the mounting structure 18. In this scenario, a known target may be positioned into the sensing volume and the position of the known target to the sensor may be determined based on a triangulation of the laser line with the sensor. For example, the laser line may be projected on a flat surface and the position and orientation of the surface determined based on the position of the laser stripe within the field of view of the sensor. The second set of lines may then be projected onto the surface and the orientation and position of the second laser source may be determined based on the projected line pattern on the surface. For example, the spacing and angle of an array of line stripes formed on the surface intersect with the laser stripe from the first laser source 14. The intersection points between the laser stripe and the pattern from the second laser source 16 can be used to determine the position and orientation of the second laser source 16.

Figure 2:
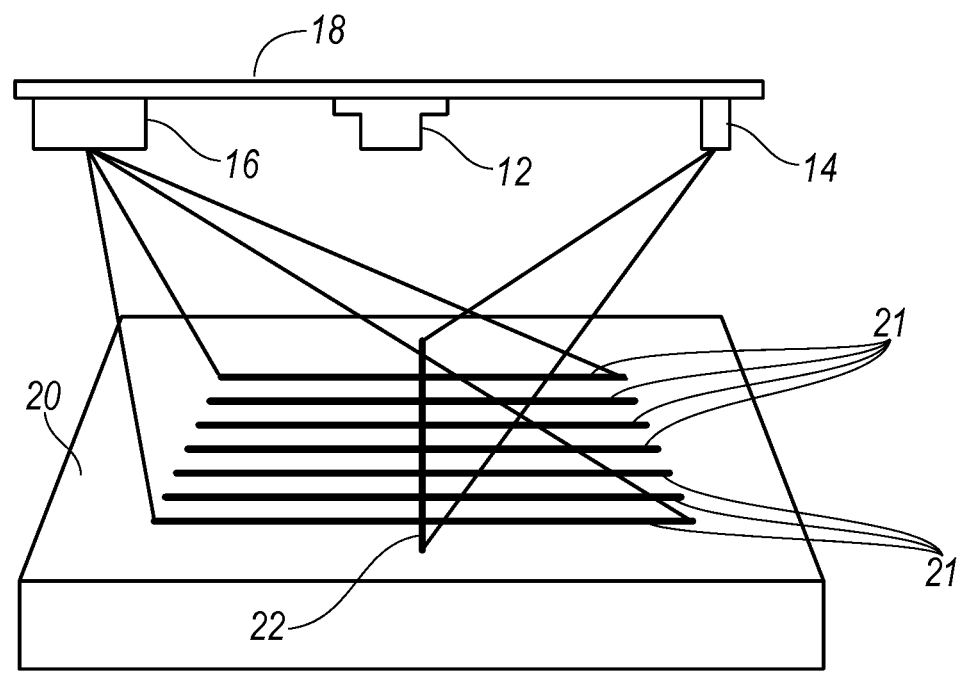
FIG. 2 is a block diagram illustrating a sensor system including a structured light projector.

Therefore, the second laser source 16 may be a structured light projector, as depicted in FIG. 2. As discussed, the detector 12 is calibrated with respect to first laser source 14. As such, these two components work together using triangulation principles. The angle between the first laser source 14, thus the laser line, and the optical axis of the sensor are used to determine the distance and location of features on the surface 20. In, addition the second laser source 16 projects a series of lines onto the surface 20. The series of lines 21 from the second laser source 16 may be oriented orthogonal to the line or lines form the first laser source 14. The intersection of the line or lines from the first laser source 14 is used to determine the surface position of the series of lines 21 on the surface from the second laser source 16. Essentially, the line 22 from the first laser source 14 acts as a reference for the projected pattern from the second laser source 16. The surface is then modeled using a camera/optics model. The camera/optics model may be generated based on taking a few field calibration images once the sensor is finally mounted using a flat surface at a number of distances from the sensor. Accordingly, the second laser source 16 can be mounted separately from the sensor 12 and first laser projector 14, and field calibrated, as described above.

Figure 3:
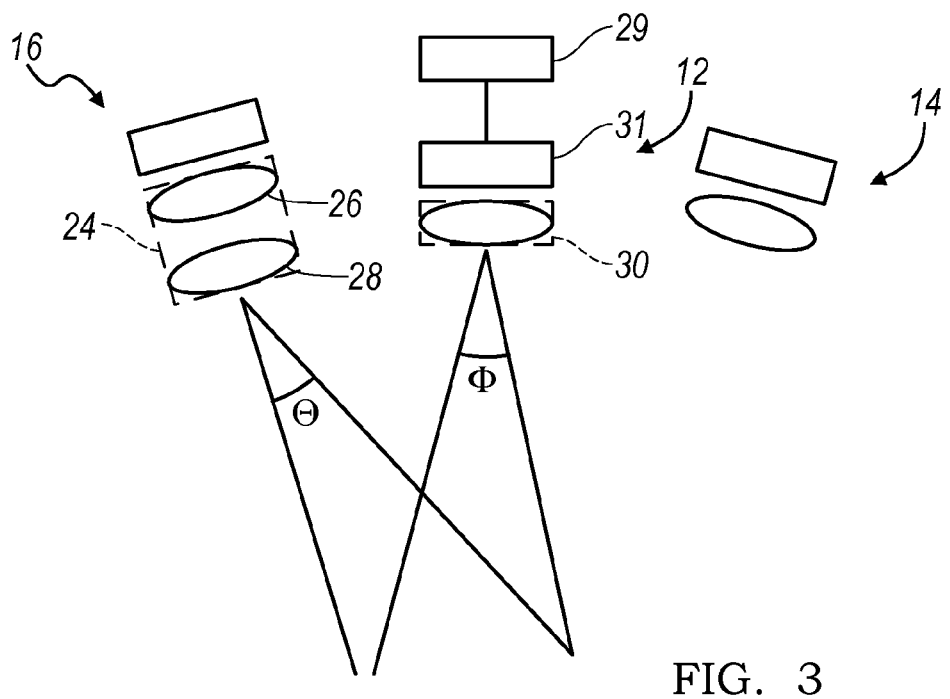
FIG. 3 is a block diagram of a sensor system illustrating the optical elements of the laser sources and sensor.

The mechanics of the sensor system of FIG. 1 are further explained with respect to FIG. 3. The keystoning effect of the structured light pattern increases the depth sensitivity of the measurement. Therefore, projection angle (theta) of second laser source 16 should be designed to be different than the receiving angle (phi) of the sensor 12. For example, the projection angle may be 10 to 15 degrees different than the receiving angle. To facilitate the key stoning effect, the projection optical system 24 of the laser projector 16 may include two lenses 26, 28. The additional lens 28 may be used to vary the magnification between the receiving optic 30 and the projection optical system 24. Specifically, the projection optical system 24 may have 1.5-3 times the magnification of the receiving optic 30 within the sensing volume. Although, other ratios may be used, this may provide particular benefits for many industrial applications.

Each of the first and second laser sources 14, 16 and the detector 31 may be in communication with the sensor controller 29. The sensor controller 29 may independently control the time and intensity of each laser source 14, 16. In addition, the sensor controller 29 controls the acquisition and integration time of the detector 30. The sensor controller 29 may alternate the projection of the first set of laser lines from the first source 14 and the second set of laser lines from the second laser source 16. In addition, the detector 31 may be synchronized with the projection of the first and second laser sources 14, 16 to capture the first set of laser lines from the first laser source 14 in the first image and the second set of laser lines from the second laser source 16 in a second image.

Figure 4:
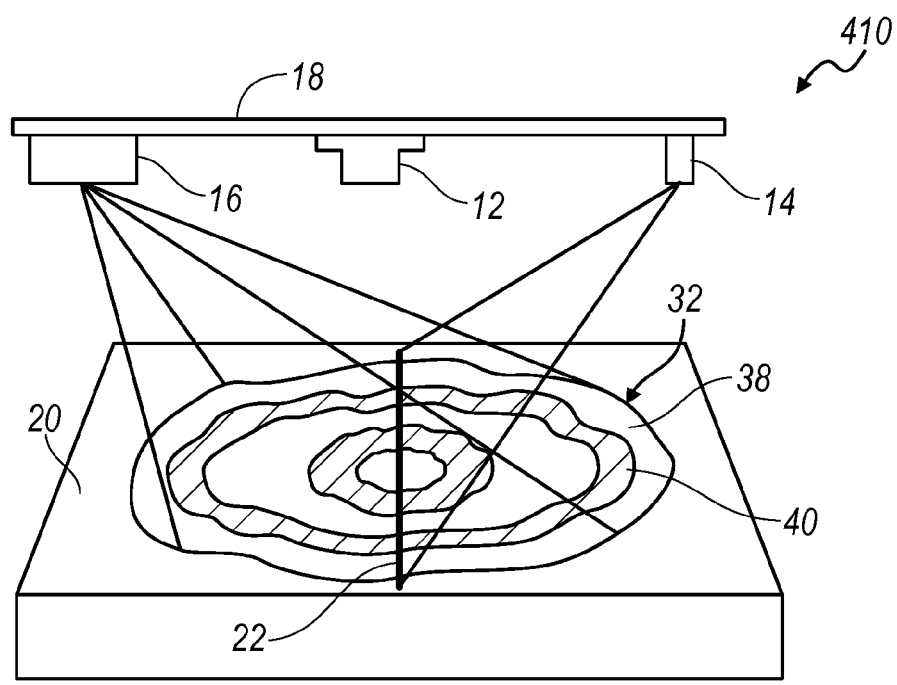
FIG. 4 is a block diagram illustrating a sensor system including a moiré fringe projector.

The second laser source 16 may also be a moiré fringe projector, as illustrated in the system 410 of FIG. 4. The moiré fringe projector may emit two wavelengths of laser beams that interfere, thereby projecting a moiré fringe pattern 32 onto the surface 20. The moiré fringe pattern 32 is like a topographical map with each ring of the fringe pattern equating to a different distance from the second laser source 16. The moiré fringe pattern 16 includes alternating rings of light rings 38 and dark rings 40 that tend to have a sinusoidal profile. Again, the line 22 acts as a reference relative to the distance of each of the rings.

Figure 5:
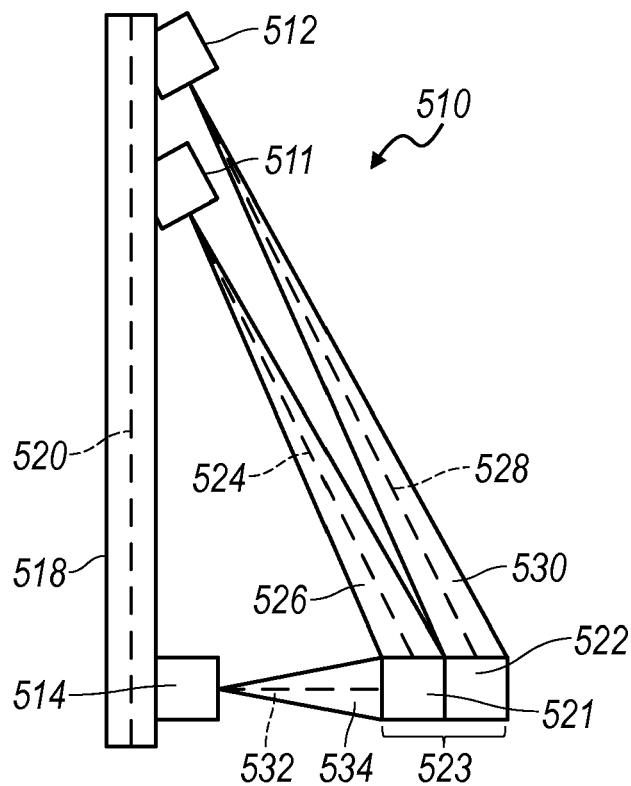
FIG. 5 is a block diagram illustrating a sensor system including a dual sensor configuration.

Another embodiment of the sensor system is illustrated in FIG. 5. The sensor system 510 includes a first sensor 511, a second sensor 512, and a laser source 514. The first sensor 511 and second sensor 512 are attached to a mounting structure 518. The first sensor 511 and second sensor 512 may be CCD, CMOS, or other similar sensors including other features, such as a sensor controller, as described with regard to sensors of the previous embodiments. The laser source 514 is also attached to the mounting structure 518 and is configured to project a laser pattern 534 onto an object. The laser pattern may be any of the patterns described above, or more specifically, may include a series of lines that are pre-calibrated relative to each of the first sensor 511 and second sensor 512. The pre-calibration may be a factory calibration as described relative to the previous embodiments.

The sensor system 510 has a sensor axis 520 that is substantially perpendicular to the optical axis 532 of the laser source 514. A first sensor 511 is oriented at an angle relative to the sensor axis 520 that is slightly less than the second sensor 512. For example, the first sensor 511 may have an optical axis 524 that is oriented at a 17° angle relative to the sensor axis 520. Further, by way of example, the second sensor 512 may have an optical axis 528 that is oriented at a 22° angle relative to the sensor axis 520. As such, the first sensor 511 has a field of view denoted by reference number 526 that intersects with a laser projection 534 to form a sensing volume 521. The axis of the laser projection 534 may be orthogonal to the sensor axis 520 and may be in plane with the sensor optical axes 528 and 524. Similarly, the second sensor 512 has a field of view 530 that intersects with the laser projection 534 to form a second sensing volume 522. The first and second sensor 511 and 512 are oriented such that the first sensing volume 521 and the second sensing volume 522 form a contiguous sensing volume 523.

Figure 6:
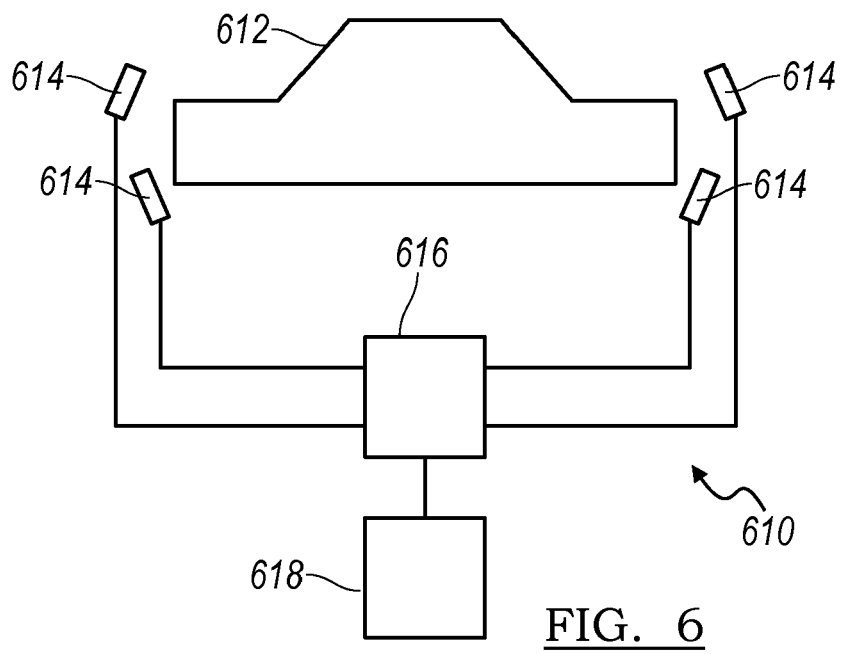
FIG. 6 is a block diagram illustrating one embodiment of a system for measuring features with the disclosed sensor implementations.

The first sensing volume 521 slightly overlaps with the second sensing volume 522 to form the contiguous sensing volume 523. The sensing volume 521 is closer to the mounting structure and sensing volume 522 and most of the sensing volume 521 does not overlap with the sensing volume 522, and similarly most of the sensing volume 522 does not overlap with sensing volume 521. For ease of illustration, the sensing volumes are shown as squares. However, it is clear that the first sensing volume 521 and second sensing volume 522 would have an actual 3-D shape formed by the intersection of the first field of view 526 with the laser projection 534 and the second field of view 530 with the laser projection 534, respectively. This shape would, of course, be expanding as the distance increases relative to the sensor or projector and may have curved outer regions based on the effects of the optical system. As such, the first sensor 511 and the second sensor 512 work together thereby greatly increasing the depth of field which can be analyzed while providing sufficient resolution for most applications. Further, it is also clear that similar to the previous embodiments, a second laser source may also be provided and oriented to project a laser pattern to intersect with the first and second sensing volumes 521, 522. As discussed above, the second laser source may be attached to the mounting structure or mounted independently In FIG. 6, a measurement system 610 including an array of sensors 614 is provided. Each sensor 614 corresponds to a sensor system 10, 410 or 510 including any variation or combination thereof described above. The system 610 includes a controller 616 and at least one sensor 614. There may be a number of sensors 614 located about a vehicle body or frame 612 to measure geometric dimensional deviations at a number of specified locations. Alternatively, a single sensor may be used along with a motion device such that the sensor 614 is able to measure multiple features along the vehicle body 612. For example, the sensor 614 may be attached to a robotic arm that can be manipulated to measure a number of features at various locations on the vehicle body 612.

The sensor 614 is in electrical communication with the controller 616 to provide a set of data for each feature measured. The sensor 614 may include an on board processor to analyze the image data and generate feature data, for example indicating the position and orientation of feature. The feature data may be communicated to the controller 616. The sensor 614 may communicate with the controller 616 over a number of wired or wireless communication protocols including but not limited to Ethernet. The controller 616 includes a microprocessor configured to analyze the data. In addition, the controller 616 is in communication with an alarm system 618 to generate an alert based on the measurements from the sensor 614. The alarm system 618 may comprise a visual indicator such as a flashing light, an audio indicator such as a siren, or both. In addition, the alarm system 618 may comprise a communication system configured to send an email, phone message, pager message, or similar alert.

Figure 7:
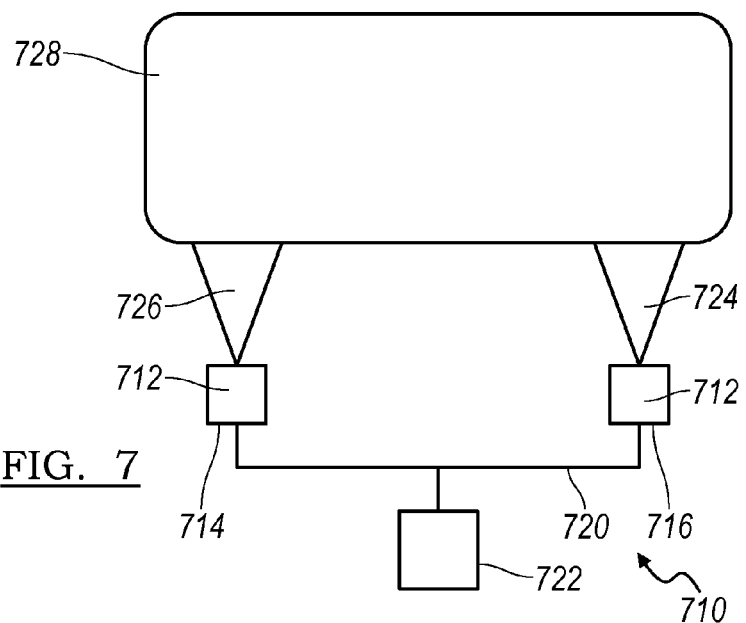
FIG. 7 is a block diagram illustrating one embodiment of a system for measuring wheel alignment with the disclosed sensor implementations.

Now referring to FIG. 7, an inspection system 710 is provided for the inspection of wheel alignment of a vehicle. As such, the inspection system 710 includes two sensor systems 712 which may correspond with any of the sensor systems 10, 410, or 510 including variations described in the previous embodiments or combinations thereof. However, for illustrative purposes, the system 710 will be described further with regards to the implementation of the sensor system 510 shown in FIG. 5. As such, the inspection system 710 includes a left sensor 714 that projects a laser pattern 726 onto a left side of tire 728. Similarly, inspection 710 includes a right sensor 716 that projects a second laser pattern 724 onto the right sidewall of the tire 728. Accordingly, the left sensor 714 and the right sensor 716 may determine the position and orientation of both the left sidewall of the tire and right sidewall of the tire 728 to determine an overall position and orientation of the tire 728.

The system 710 may be duplicated for each tire on the vehicle and accordingly a wheel alignment calculation may be performed including such measurements as toe, camber, pitch, etc., for each wheel of the vehicle. The sensor system 712 may be in communication over a communication link 720 to a controller 722. The communication link 720 may include wired or wireless communications including serial communications, Ethernet, or other communication mediums. The controller 722 may include a processor, memory, and display to perform a wheel alignment measurement. In addition, the controller 722 may be in communication with other sensor systems 712 measuring other tires or other controllers configured to inspect the alignment of other wheels on the vehicle.

Figure 8:
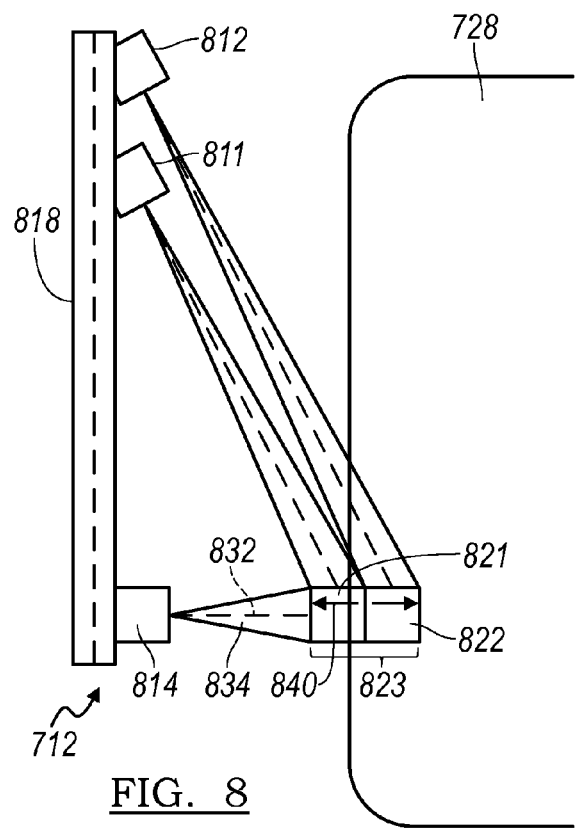
FIG. 8 is a side view of one embodiment of a system for measuring wheel alignment with the sensor implementation of FIG. 5.

Now referring to FIG. 8, a side view of the system 810 is provided illustrating one embodiment of the system in FIG. 7 implementing a dual sensor system described in FIG. 5. The sensor system 812 includes a first sensor 811 a second sensor 812, and a laser source 814. Each of the first sensor 811, the second sensor 812, and the laser source 814 may be attached to the mounting structure 818. The field of view of each of the first and second sensor 811, 812 intersect with the laser projection 834 of the laser source 814 to form a first and second sensing volume 821, 822. Further, the first sensing volume 821 and second sensing volume 822 overlap to form a continuous system sensing volume 823. As described above in reference to FIG. 5, the contiguous sensing volume 823 allows for increased sensing range between the sensor system 712 and the wheel 728.

This increased sensing range denoted by arrow 840 allows for the accommodation of a large number of tire models and wheel base vehicles, as well as a large steering angle change during a wheel alignment inspection. Further, the laser source 814 may include optics that provide a 1.5 to 3 times magnification relative to the receiving optics of both the first sensor 811 throughout the first sensing volume 821 and the second sensor 812 throughout the second sensing volume 822.

Figure 9:
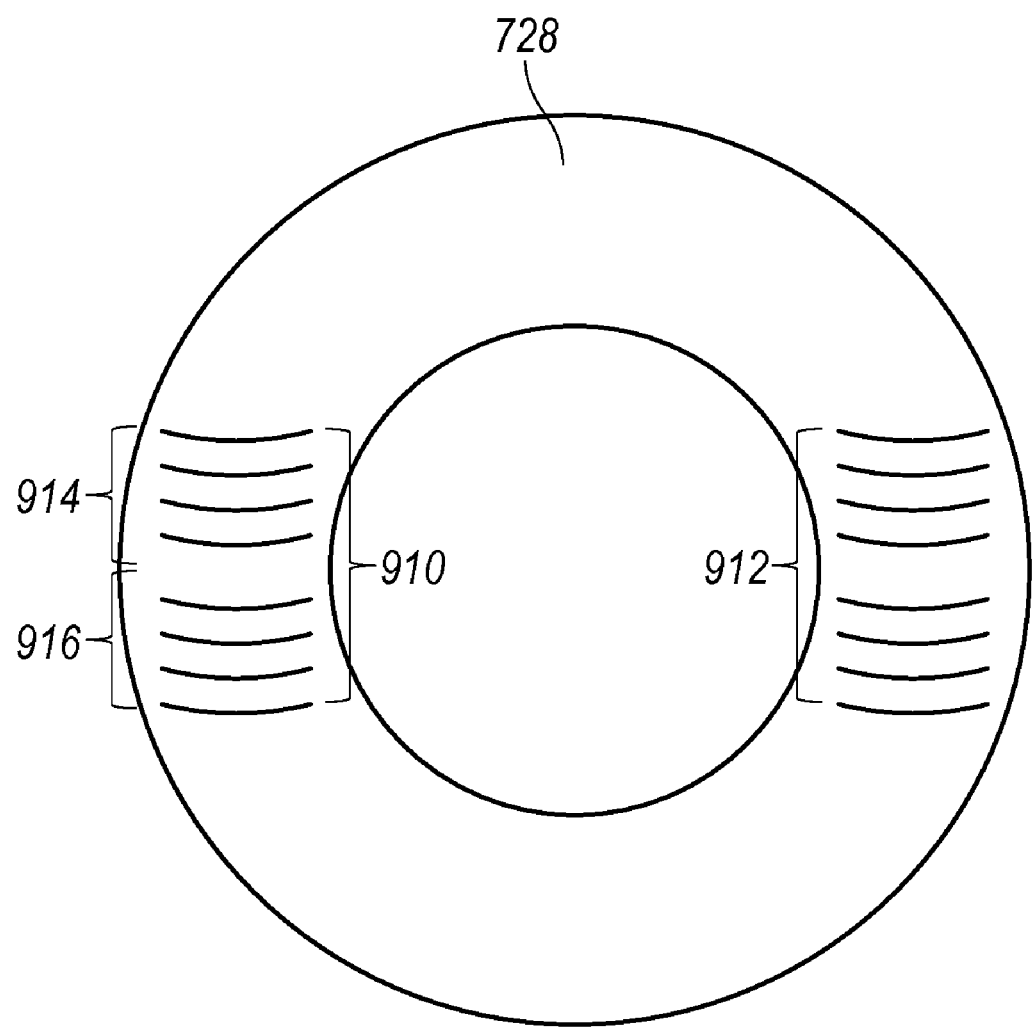
FIG. 9 is a front view of a laser pattern projected onto a tire for one embodiment of a system for measuring wheel alignment.

Now referring to FIG. 9, a front view of the tire illustrating one embodiment of the projected laser pattern is provided. In this embodiment, the left sensor 714 projects a laser pattern 910 including a series of parallel lines onto the left-hand sidewall of the tire 728. Similarly, the right sensor 716 projects a pattern 912 including a series of lines onto the right-hand sidewall of the tire 728. The pattern may include a first set of lines 914 and a second set of lines 916, where the first set of lines 914 are parallel and have equal spacing between each consecutive line. Similarly, the second set of lines 916 may have a set of parallel lines where each consecutive line has equal spacing. Further, the spacing for the second set of lines 916 may be the same as the spacing provided in the first set of lines 914.

Figure 10:
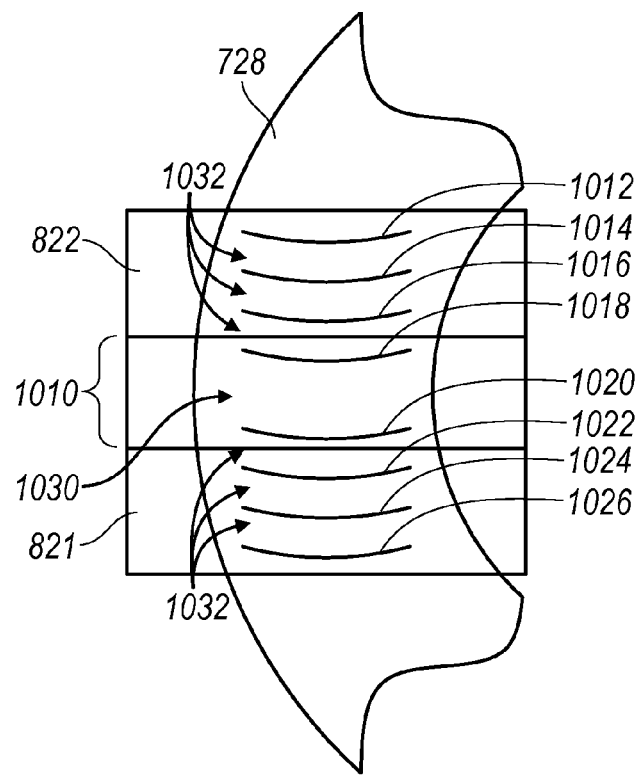
FIG. 10 is front view of a laser pattern projected onto a tire for one embodiment of a system for measuring wheel alignment.

Now referring to FIG. 10, the first and second set of lines 914 and 916 are described in more detail. The first set of lines 914 may include a first line 1012, a second line 1014, a third line 1016 and a fourth line 1018. Further, the second set of lines may have a fifth line 1020, a sixth line 1022, a seventh line 1024 and an eighth line 1026. The lines may have equal spacing as denoted by reference numeral 1032. However, the distance between the fourth line 1018 and the fifth line 1020 may include a greater spacing 1030 as a line identification. The spacing 1030 may be, for example, twice the spacing as between the other lines. This may be easily and effectively accomplished by modifying the grating of a laser line projection source such that the middle two lines of the grating are not etched but filled in and therefore do not transmit light. The additional spacing 1030 may be used to identify specific line numbers in the pattern.

The first sensing volume 821 of the first sensor and the second sensing volume 822 of the second sensor may have an overlap region 1010 such that the double spacing 1030 may be detected by each of the first sensor and second sensor. Accordingly, the overlap 1010 would be great enough to show the fourth line 1018 in the first sensing volume 821 and the fifth line 1020 in the second sensing volume 822. However, as can be readily understood, the array of lines may include more than eight lines and as such, the fourth line 1018 and the fifth line 1020 would be representative of the middle two lines of the pattern. Using the change in spacing encodes the line pattern and allows the system to easily identify the middle two lines, thereby identifying each line within each sensing volume. After identifying each line, the relationship between the position of the object, in this case the wheel 728 may be determined using a sensor model and the predetermined calibration parameters. The sensor model may include a camera model that accounts for the detector and optical parameters of the sensor, as well as, a laser source model that accounts for the laser pattern and projection objects. Further, the sensor model and laser source model may be linked by the predetermined calibration parameters to provide 3D point cloud data on the object.

Figure 11:
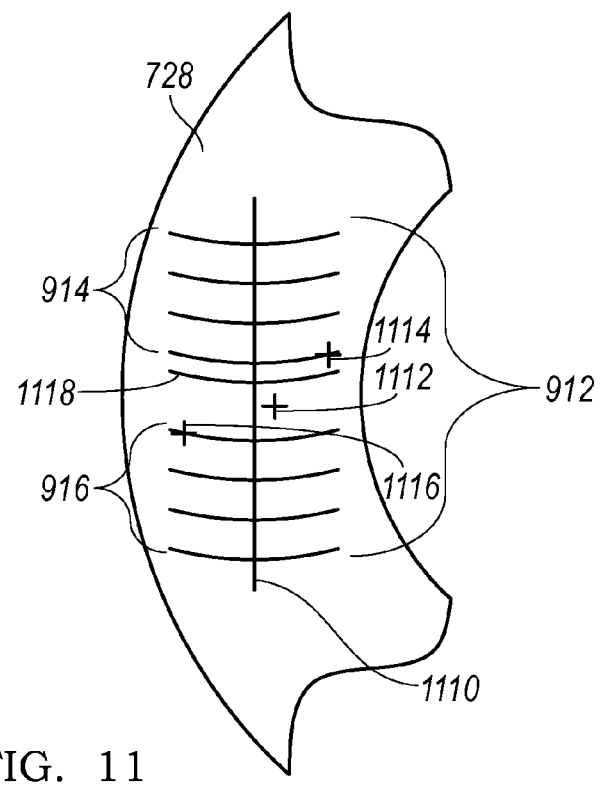
FIG. 11 is front view illustrating various laser pattern implementations projected onto a tire for one embodiment of a system for measuring wheel alignment.

Now referring to FIG. 11, additional embodiments are provided for identifying each line in the pattern 912. In one embodiment a second laser line 1110 may be provided orthogonal to the series of laser lines from a second laser projector. Alternatively, a unique symbol 1112, such as a crosshair, may be provided in addition to the series of lines that may be used to identify each of the lines in the series based on a spacial relationship. In another alternative, each of the middle two lines may have a mark 1114, 1116, such as a cross tick where the cross tick 1114 on the first set of lines 914 is on one side and the cross tick 1116 of the second set of lines 916 is on an opposite side. As such, each of the cross ticks is distinguishable and may be used to identify each of the lines in the series of lines based on the spacial relationship. In yet another alternative, the spacing between the lines may vary such that the number of each line may be identified based on a varied spacing relationship between one or more of the consecutive lines. In one example, a double line 1118 may be provided. The two lines may be provided closely together uniquely identifies one line in the series of lines and then each of the other lines may be identified by a consecutive spacial relationship. Further, other identifying characteristics may be provided for encoding the series of consecutive lines including other various unique marks, or line spacing, line thicknesses, or line orientation.

Figure 12:
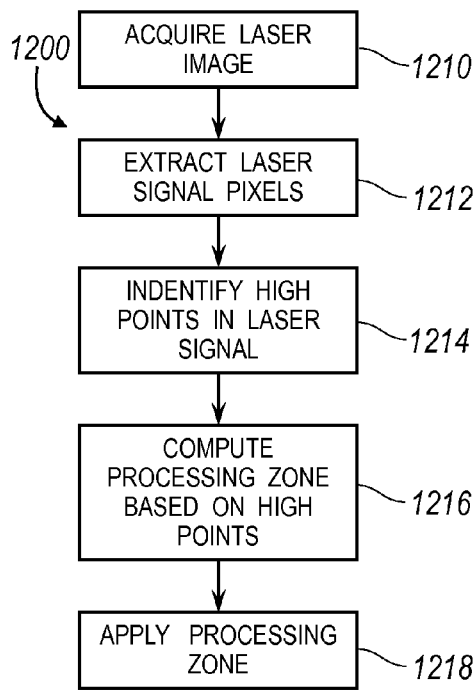
FIG. 12 is a flow chart illustrating a method for dynamic image processing window adjustment.

Now referring to FIG. 12, a method for dynamic image processing window adjustment is provided. A method 1200 starts in block 1210. In block 1210, a laser source projects a pattern onto a feature and an image is acquired of the pattern intersecting the feature. In one implementation, the pattern may be the parallel lines 912 in FIG. 9. In block 1212, the laser signal pixels are extracted from the image. As such, each of the pixels along the line may be transformed into a line intensity profile. As such, a reference line is defined that is substantially orthogonal to the series of laser lines and may be acquired with temporal offset. A laser line profile is determined by adding the intensity value orthogonal to the reference line after correction for sensor and laser projection distortions by a camera and/or laser projection model. In block 1214, high points are identified in the laser profile. Processing zones are computed based on the high points in the profile, as denoted by block 1216. Finally, processing zones are applied and 3D point cloud data is extracted based on general triangulation principles.

Figure 13:
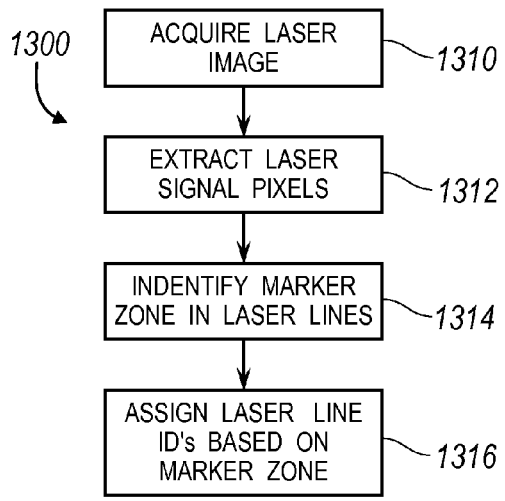
FIG. 13 is a flow chart illustrating a method for dynamic identification of laser lines.

Referring to FIG. 13, a method for the dynamic identification and assignment of laser lines is provided. The method 1300 starts in block 1310. In block 1310, the laser is projected onto the feature and an image is acquired. In block 1312, the laser signal pixels are extracted. The marker zones in the laser lines are identified as denoted by block 1314. The laser line data is projected on to a reference line, a threshold is applied to integrated projected values to identify nodes points on the laser lines. The node points along the reference line are then extracted. The reference line may represent the mean location on the object being measured. The spacing between nodes are then used to identify line numbers. In one exemplary, the numbering will start from the center where we have higher spacing relative to its immediate neighbors. In block 1316, the laser line numbers are assigned based on the marker zones.

As such, it is understood that the method shown in FIGS. 12 and 13 may be utilized together in a single process. For example, the marker zones may be identified 1314 and laser line numbers assigned 1316 in between step 1216 and the point cloud data being extracted. Further, the above described methods may be performed by the sensor controller and as such the point cloud data may be transmitted from the sensor to the system controller. Alternatively, the system controller may be utilized for implementing the methods.

Figure 15:
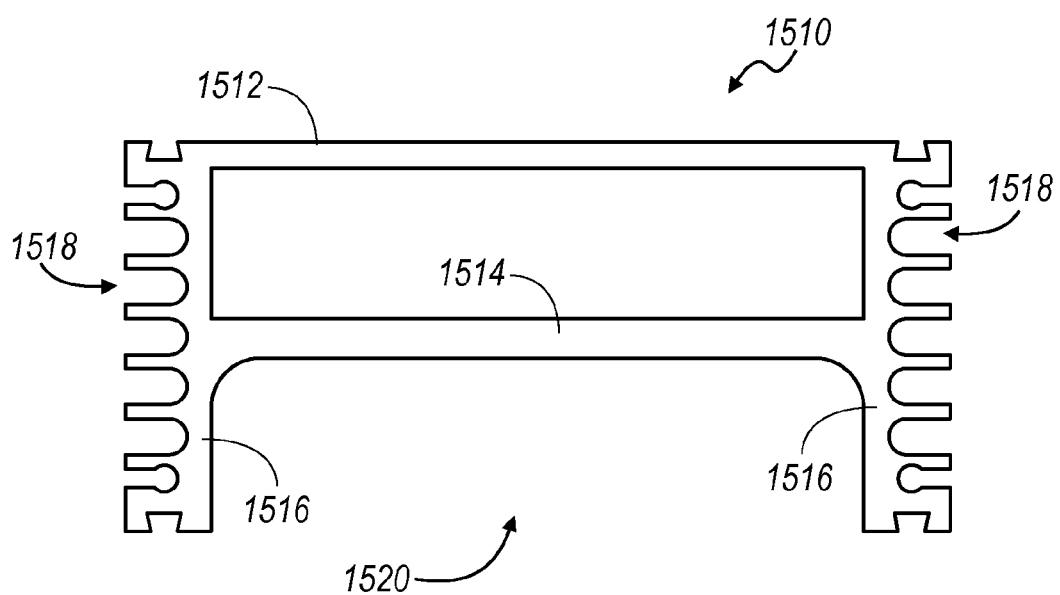
FIG. 15 is top view of a mounting structure for a sensor system.

Referring to FIG. 15, the mounting structure 18 may be an I-tube 1510. The I-tube includes a tube portion 1512 with an I-beam 1514. Walls 1516 extend beyond the I-beam 1514 and form a recess 1520. The laser source and detectors may be mounted in the recess 1520 to the I-beam 1514. In addition, the I-tube may include cooling fins 1518 to increase dissipation of heat. The I-tube 1510 may be formed from a number of materials including but not limited to steel, invar, aluminum, or other industrial materials. The I-tube 1510 may include a number of temperature sensors to compensate for expansion of the I-tube material. As such, the I-tube 1510 provides both passive thermal management as well as provides a linear response. The tubular shape and I-beam limit expansion in directions other than along the length of the tube. The linear response without hysterisis enables accurate active thermal compensation.

Figure 14:
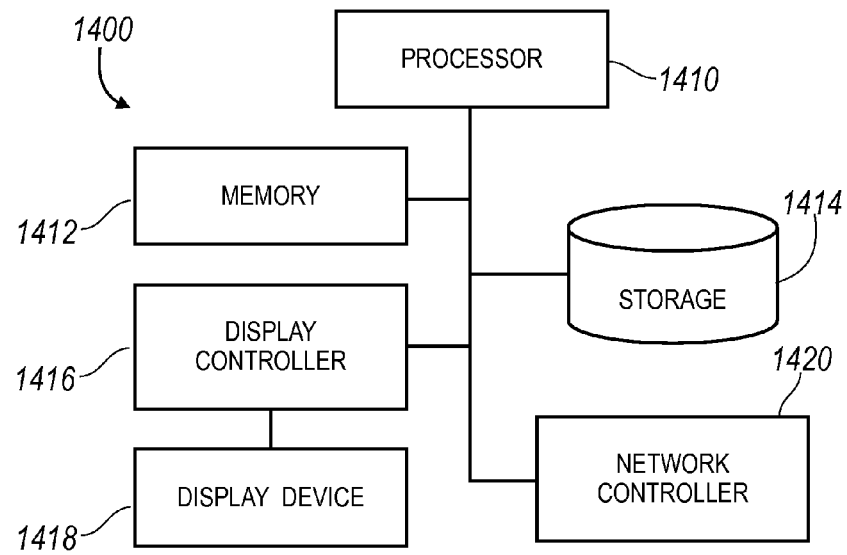
FIG. 14 is a block diagram of a system illustrative of one implementation of the controllers, processors, or modules in the instant application.

Any of the modules, controllers, servers, or engines described may be implemented in one or more general computer systems. One exemplary system is provided in FIG. 14. The computer system 1400 includes a processor 1410 for executing instructions such as those described in the methods discussed above. The instructions may be stored in a computer readable medium such as memory 1412 or a storage device 1414, for example a disk drive, CD, or DVD. The computer may include a display controller 1416 responsive to instructions to generate a textual or graphical display on a display device 1418, for example a computer monitor. In addition, the processor 1410 may communicate with a network controller 1420 to communicate data or instructions to other systems, for example other general computer systems. The network controller 1420 may communicate over Ethernet or other known protocols to distribute processing or provide remote access to information over a variety of network topologies, including local area networks, wide area networks, the internet, or other commonly used network topologies.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A sensor system for analyzing a feature in a contiguous sensing volume, the sensor system comprising:
a mounting structure;
a first laser source being attached to the mounting structure and configured to project a pattern into the sensing volume and onto the feature forming a laser stripe on the feature;
a first sensor being attached to the mounting structure and configured to image the laser stripe where the laser line intersects with the feature, a relationship between the first sensor and the first laser source having been precalibrated;
a second sensor being attached to the mounting structure and configured to image the laser stripe where the laser line intersects with the feature, a relationship between the second sensor and the first laser source having been precalibrated;
wherein the first sensor having a field of view that intersects with the pattern projected from the first laser source forming a first sensing volume, the second sensor having a field of view that intersects with the pattern projected from the first laser source forming a second sensing volume, the contiguous sensing volume being formed by the first and second sensing volume, wherein an encoded portion of the pattern is visible in both the first and second sensing volumes and wherein most of the first and second sensing volumes are not overlapping.

2. The sensor system according to claim 1, wherein the pattern is a series of lines.

3. The sensor system according to claim 2, wherein the series of lines are encoded to identify at least one line of the series of lines.

4. The sensor system according to claim 3, wherein the pattern is encoded by a unique spacing between a set of lines in the series of lines.

5. The sensor system according to claim 3, wherein the pattern is encoded by a unique symbol projected onto the series of lines.

6. The sensor system according to claim 1, wherein the pattern is a moiré fringe projection.

7. The sensor system according to claim 1, wherein first laser source has a projection optic and the first sensor has a receiving optic, the projection optic having a magnification that is greater than the receiving optic.

8. The sensor system according to claim 7, wherein the projection optic of the first laser source has a magnification that is 1.5 to 3.0 times the receiving optic of the first sensor throughout the first sensing volume.

9. The sensor system according to claim 8, wherein the projection optic of the first laser source has a magnification that is 1.5 to 3.0 times a receiving optic of the second sensor throughout the second sensing volume.

10. A method for analyzing a feature in a contiguous sensing volume, the method comprising:
projecting a pattern into a sensing volume and onto the feature forming a pattern on the feature;
imaging the pattern where the pattern intersects with the feature using a first sensor;
imaging the pattern where the pattern intersects with the feature using a second sensor;
wherein the first sensor has a field of view that intersects with the pattern forming a first sensing volume, the second sensor having a field of view that intersects with the pattern forming a second sensing volume, the contiguous sensing volume being formed by a combination of the first and second sensing volume, wherein an encoded portion of the pattern is visible in both the first and second sensing volumes and wherein most of the first and second sensing volumes are not overlapping.

11. The method according to claim 10, wherein the pattern is a series of lines.

12. The method according to claim 11, wherein the series of lines are encoded to identify at least one line of the series of lines.

13. The method according to claim 12, wherein the pattern is encoded by a unique spacing between a set of lines in the series of lines.

14. The method according to claim 12, wherein the pattern is encoded by a unique symbol projected onto the series of lines.

15. The method according to claim 10, wherein the pattern is a moiré fringe projection.

16. The method according to claim 10, wherein first laser source has a projection optic and the first sensor has a receiving optic, the projection optic having a magnification that is greater than the receiving optic.

17. The method according to claim 16, wherein the projection optic of the first laser source has a magnification that is 1.5 to 3.0 times the receiving optic of the first sensor throughout the first sensing volume.

18. The method according to claim 17, wherein the projection optic of the first laser source has a magnification that is 1.5 to 3.0 times a receiving optic of the second sensor throughout the second sensing volume.

* * * * *